Jan. 14, 1958    W. J. D. VAN DIJCK ET AL    2,820,001
RECTIFICATION PROCESS
Original Filed July 28, 1947
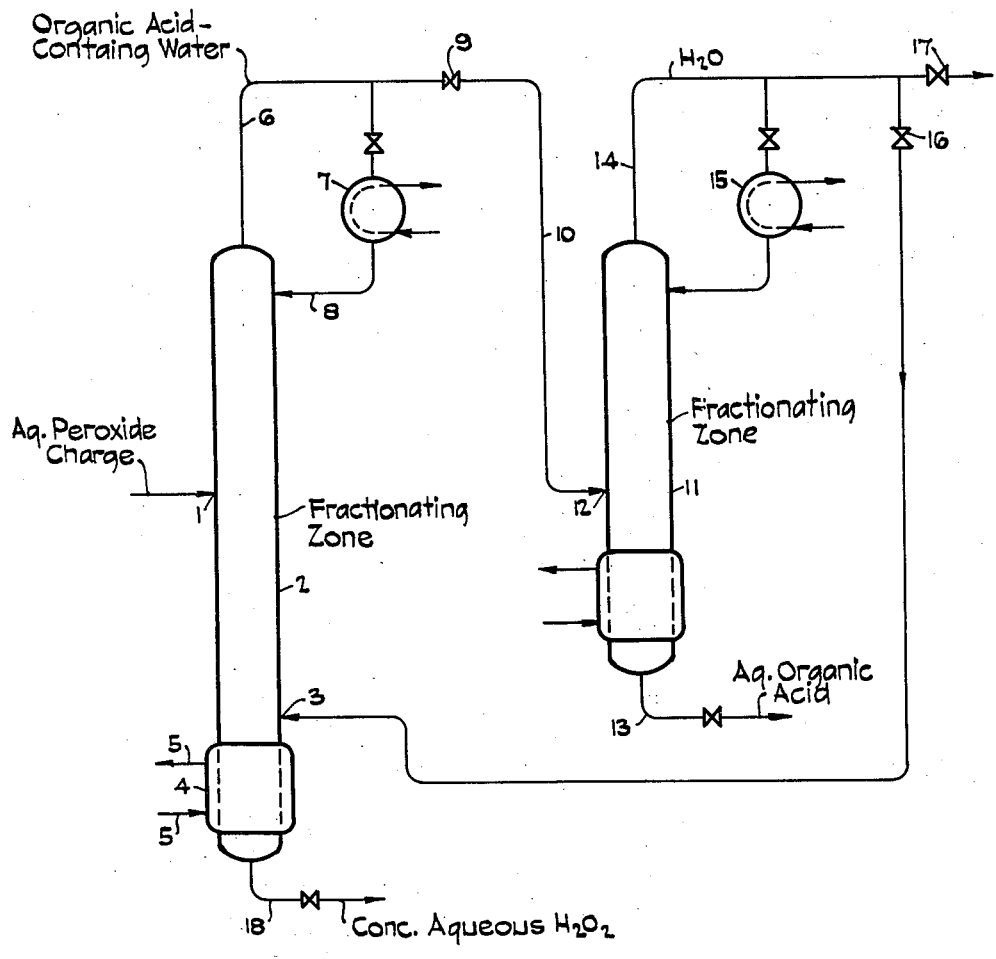

United States Patent Office 2,820,001
Patented Jan. 14, 1958

2,820,001

RECTIFICATION PROCESS

Willem J. D. Van Dijck, The Hague, and Pieter L. Kooijman, Amsterdam, Netherlands, assignors to Shell Development Company, New York, N. Y., a corporation of Delaware Original application July 28, 1947, Serial No. 764,240, now abandoned. Divided and this application January 19, 1953, Serial No. 331,952

Section 1, Public Law 690, August 8, 1946
Patent expires April 6, 1963

3 Claims. (Cl. 202—46)

This invention relates to a process for separating a mixture of three components of divergent boiling points by rectification. By "components" is also meant groups of substances, i. e., the mixture may contain more than three substances.

This application is a division of application Serial No. 764,240 filed July 28, 1947, now abandoned.

It is known to separate a mixture of substances having different volatilities by rectification; the higher boiling components will then constitute the bottom product, while the lower boiling components leave the distillation zone as top product.

In contrast with such known methods, the present invention has for an object a rectification process in which the bottom product or distillation residue contains the highest boiling component together with part of the lowest boiling component, free from or containing only minor amounts of the component having an intermediate boiling point and the component of intermediate boiling point is withdrawn as top product, together with a portion of the component of lowest boiling point. Such a method is particularly advantageous in situations wherein the highest boiling component is to be freed from the component of intermediate boiling point but is unstable, i. e., subject to decomposition or chemical change in the pure state at the conditions prevailing in the distillation unless diluted with the component of highest volatility.

This object is attained by introducing the initial mixture to be separated into a fractional distillation zone at an intermediate point to form distilling vapors and liquid; contacting the liquid countercurrently with vapors of the lowest boiling component; and controlling the conditions within the distillation zone so that the highest boiling component, together with part of the lowest boiling component constitutes the bottom product, and the component of intermediate boiling point, together with part, usually the remainder, of the lowest boiling component, leaves the distillation zone as top product. As is well known, in fractional distillation zones the liquid moves downstream through a series of stages or through packing or other contact means toward the point at which the bottom product is withdrawn. The countercurrent contacting practiced in carrying out the method according to this invention is achieved by introducing a quantity of the lowest boiling component in addition to that in the initial mixture into the distillation zone at a point downstream with respect to the intermediate point at which the initial mixure is introduced.

Fractional distillation zones may comprise various arrangements of stages, and the invention may be practiced in any such apparatus. One common type involves an inclined or vertical column containing packing material or bubble plates; in such type of equipment the initial mixture is introduced at a point situated between the top and the bottom and the downstream point is near the bottom of the column.

The invention is particularly applicable to mixtures in which the most volatile and the least volatile components differ greatly in their boiling points, while the volatilities of the most volatile component with respect to the least volatile component is of the same order of magnitude as that of the component of intermediate volatility with respect to the least volatile component. Frequently this volatility relationship is such that the boiling points of the most volatile component and of the component of intermediate volatility are close together; this is not, however, always necessary.

The lowest boiling component is preferably introduced into the downstream point in the vapor state; in this case it may be used to supply the necessary heat to the distillation. It is, however, in any case possible to employ a heating coil or reboiler, and even to introduce the most volatile component in the liquid state and to vaporize it near the downstream end of the distillation zone. Such introduced material may be obtained from an outside source, but preferably the component of lowest boiling point is derived from the system itself, after having been separated from the component of intermediate boiling point. The latter expedient is advantageous when the process is carried out continuously. When obtained from the system itself, the introduced component of lowest boiling point is preferably substantially pure, but may contain minor amounts of the component of intermediate boiling point.

The process according to this invention is especially, although not exclusively, applicable in those cases in which the highest boiling component is a substance which is unstable under the conditions of the usual rectifying processes. This is the case with hydrogen peroxide-containing products and with products containing various organic peroxides, such as those resulting from the incomplete oxidation of hydrocarbons in the manner described in U. S. Patent No. 2,376,257 and Netherlands Patent No. 52,521. The products obtained by the processes described in these patent specifications always contain more or less considerable quantities of hydrogen peroxide and/or organic peroxides. If it is desired to prepare pure solutions of hydrogen peroxide from such products, applying a rectification, the danger of explosion is very great, since at elevated temperatures the organic peroxides are very unstable, as a result of which the stability of the hydrogen peroxide is greatly reduced.

The organic substances present in the products of partial oxidation of hydrocarbons are oxy-alkyl peroxides. It has heretofore been proposed to remove or to convert these organic peroxides prior to recovering pure hydrogen peroxide from the partial combustion products by distillation. The conversion may be effected by changing peroxides into acids, to which end the combustion product is heated for some time, preferably between 40° and 100° C. The aqueous solutions of hydrogen peroxide and acids thus obtained may be separated by fractional distillation in the presence of salts, the danger of explosion being greatly reduced.

It has now been found, however, that when applying the process of this invention to solutions of hydrogen peroxide and acids, such as formic acid, there is no danger of explosion.

If it is desired to prepare a pure hydrogen peroxide solution from a mixture of hydrogen peroxide, formic acid and water according to the present invention, this mixture is introduced into the rectifying column at a suitable point between the top and bottom of the column and the liquid in the column is subsequently contacted with water vapor in countercurrent. For this purpose use is preferably made of part of the water vapor obtained after rectification and of the top product (i. e. from the mixture of formic acid and water). Thus, on the one hand, a high-boiling azeotrope of formic acid and water, and, on the other hand, aqueous hydrogen peroxide solution, are obtained as final products.

When carrying out the process according to the invention the construction of the rectification apparatus is dependent upon the type of the initial mixture, as well as the degree of fractionation required, e. g., the desired degree of purity of the products.

The invention is illustrated by the following examples relating to the preparation of purified aqueous hydrogen peroxide and formic acid from a mixture of hydrogen peroxide, formic acid and water, with reference to the accompanying drawing forming a part of this specification, the single figure of which is a schematic flow diagram of the apparatus and steps used. The invention is not, however, limited to the specific embodiment shown in the drawing and described below.

*Example I*

30 cc. of a preheated aqueous solution containing a total of 183 m. mols (milli-mols) of hydrogen peroxide (boiling point about 150° C. at 76 cm. of Hg) and 72 m. mols of formic acid (boiling point 107° C. at 76 cm. of Hg in the form of its azeotrope with 22.5% water), are introduced into a rectifying column 2 at an intermediate point 1, at a constant rate and in the course of 63 minutes. During this period 294 grams of steam are admitted at a downstream point 3 from a source to be described presently.

The pressure within the column is maintained at 40 mm. of Hg, and heat is supplied to the kettle by means of a heating liquid jacket 4 circulated via conduits 5. The feed mixture flows downwardly in the column, countercurrently to the ascending stream of water vapor, which strips formic acid from the liquid. Vapors taken off overhead at 6 are divided into two streams: A portion is condensed in condenser 7 and returned to the column as reflux via line 8; the remainder is flowed through valve 9 and line 10. During the 63-minute period 310 grams of a top product, consisting mainly of water, and containing 65 m. mols of formic acid and 10 m. mols of hydrogen peroxide, are withdrawn through the line 10. This top product is introduced in the gas phase into a second rectifying column 11 at an intermediate point 12, wherein it is split up into a bottom product containing chiefly formic acid (in the form of its azeotrope), withdrawn at 13, and pure water vapor withdrawn at 14. A portion of the latter is condensed in the condenser 15 and returned as reflux. Most of the uncondensed water vapor is flowed through valve 16 and introduced into the column 2 at the point 3; excess water vapor is discharged from the process via valve 17.

The bottom product from the column 2 is drawn off at 18 and consists of 13 cc. of a concentrated hydrogen peroxide solution, containing 146 m. mols of hydrogen peroxide and only 2 m. mols of formic acid.

*Example II*

100 cc. of an aqueous solution obtained by the oxidation of propane according to the process described in the aforementioned U. S. Patent No. 2,376,257, and which contains a total of 1240 mg. equivalents of active oxygen and 370 m. mols of a mixture of addition products of hydrogen peroxide with formaldehyde and with acetaldehyde (mainly formaldehyde) is gradually introduced into the column 2 at 1 in the course of two and a half hours. During this time 590 grams of steam were admitted at point 3. The column was so operated that the residence time of the peroxide solution in the column was approximately two hours.

During the rectification several conversions occur in the peroxide solution. The organic peroxides present in the solution are decomposed while formic acid and acetic acid (to a lesser extent) are formed. Only a small portion of the hydrogen peroxide contained in the solution is decomposed.

The mixture of formic acid and acetic acid, hydrogen peroxide and water to be separated is, therefore, formed within the rectifying column during the process of rectification from the mixture of organic peroxides, hydrogen peroxide and water. This has the advantage that any formic acid and acetic acid produced is immediately carried off by the steam introduced, thus entirely or substantially precluding a reaction between hydrogen peroxide and the organic acid with the attendant formation of carbon dioxide, and thereby limiting the loss of hydrogen peroxide. The pressure in the column is maintained at 100 mm. of Hg, and the other conditions are controlled to produce sufficient reflux.

In the two and a half hour period 640 grams of a top product, containing 340 m. mols of formic acid and acetic acid (mainly formic acid) are withdrawn via conduit 10. The bottom product, drawn off at 18, consists of 32 grams of concentrated aqueous hydrogen peroxide solution containing 335 m. mols of hydrogen peroxide and 7 m. mols of organic acid (mostly formic acid with small amounts of acetic acid).

We claim as our invention:

1. The process for the recovery of hydrogen peroxide free of any substantial amount of organic impurities from an aqueous mixture comprising formic acid and hydrogen peroxide which comprises introducing said aqueous mixture into a fractionating zone at a point intermediate the points of removal of vapor overhead and liquid bottoms, introducing water vapor into said fractionating zone at a point intermediate the point of introduction of said aqueous mixture and the point of withdrawal of liquid bottoms, fractionating said aqueous mixture in the presence of said added water vapor in said fractionating zone, thereby forming a vapor fraction comprising water vapor and formic acid and a liquid fraction comprising water and hydrogen peroxide free of any substantial amount of organic impurities in said fractionating zone, separately withdrawing said vapor fraction and said liquid fraction from the upper and lower parts respectively of said fractionating zone, condensing said vapor fraction withdrawn from the upper part of said fractionating zone, and returning a part of the condensed vapor fraction as reflux to the upper part of said fractionating zone.

2. The process in accordance with claim 1 wherein the vapor fraction withdrawn from said fractionating zone is subjected to fractionation in a separate second fractionating zone thereby effecting the separation of a vapor fraction comprising water vapor from a liquid fraction comprising said organic acid in said second fractionating zone, and employing at least a part of said vapor fraction separated in said second fractionating zone as the water vapor introduced into the first fractionating zone.

3. The process for the recovery of hydrogen peroxide free from any substantial amount of organic impurities from an aqueous mixture comprising formic acid and hydrogen peroxide, which comprises fractionally distilling said aqueous mixture in the presence of water vapor in a fractionating zone, thereby forming a vapor frac-
tion comprising water vapor and formic acid and a liquid fraction comprising water and hydrogen peroxide in said fractionating zone, separately removing said vapor fraction and said liquid fraction from said fractionating zone, condensing said vapor fraction withdrawn from the upper part of said fractioning zone, and returning a part of the condensed vapor fraction as reflux to the upper part of said fractionating zone.

References Cited in the file of this patent

UNITED STATES PATENTS

| | | |
|---|---|---|
| 2,177,183 | Kraft | Oct. 24, 1939 |
| 2,178,496 | Schmidt | Oct. 31, 1939 |
| 2,298,064 | MacMullin | Oct. 6, 1942 |
| 2,350,584 | Buell et al. | June 6, 1944 |
| 2,376,257 | Lacomble | May 15, 1945 |
| 2,388,834 | Douslin et al. | Nov. 13, 1945 |
| 2,411,809 | Rupp et al. | Nov. 26, 1946 |
| 2,416,156 | Cook | Feb. 18, 1947 |
| 2,433,060 | Ohsol et al. | Dec. 23, 1947 |
| 2,461,988 | Kooijman | Feb. 15, 1949 |